United States Patent [19]

Escaron et al.

[11] E Patent Number: Re. 32,336

[45] Reissued Date of Patent: Jan. 27, 1987

[54] METHOD AND APPARATUS FOR CONDUCTING LOGGING OR PERFORATING OPERATIONS IN A BOREHOLE

[75] Inventors: Pierre C. Escaron; Joachim A. Hoppe, both of Houston, Tex.

[73] Assignee: Schlumberger Technology Corporation, Houston, Tex.

[21] Appl. No.: 620,987

[22] Filed: Jun. 15, 1984

Related U.S. Patent Documents

Reissue of:

[64] Patent No.: 4,349,072
Issued: Sep. 14, 1982
Appl. No.: 194,016
Filed: Oct. 6, 1980

[51] Int. Cl.[4] ..... E21B 23/08; E21B 43/11; E21B 47/00

[52] U.S. Cl. ..... 166/250; 166/55; 166/65.1; 166/297; 166/383

[58] Field of Search ..... 166/250, 253, 254, 255, 166/297, 298, 385, 55.1, 55, 65 R, 65.1, 383, 382, 381, 242, 243; 175/40, 41

[56] References Cited

U.S. PATENT DOCUMENTS

| | | | |
|---|---|---|---|
| 2,337,269 | 12/1943 | Piety | 175/41 X |
| 2,726,848 | 12/1955 | Montgomery et al. | 175/40 X |
| 2,844,205 | 7/1958 | Carothers | 166/250 |
| 3,727,693 | 4/1973 | Tausch et al. | 166/383 |
| 3,957,119 | 5/1976 | Yonker | 166/383 |
| 3,976,347 | 8/1976 | Cooke et al. | 339/35 |
| 4,063,592 | 12/1977 | Youmans | 166/67 |
| 4,064,939 | 12/1977 | Marquis | 166/253 |
| 4,082,144 | 4/1978 | Marquis | 166/250 |
| 4,116,274 | 9/1978 | Rankin et al. | 166/206 |
| 4,126,848 | 11/1978 | Denison | 166/206 X |
| 4,194,577 | 3/1980 | Vann | 175/4.51 |
| 4,278,127 | 7/1981 | Rankin | 166/297 X |

OTHER PUBLICATIONS

Grigorian, A. M., "Formation Exposure Through Branched (Multi-Bottom) and Horizontal Wells", published by Nedra Press, Moscow, 1969, pp. 76–79.

"Ultrahigh-Angle Wells are Technical and Economic Success", *The Oil and Gas Journal,* Jul. 19, 1976.

*Primary Examiner*—Stephen J. Novosad

[57] ABSTRACT

A method and apparatus for conducting logging or perforating operation in a borehole, particularly a deviated borehole, includes lowering a length of drill pipe having the well-logging tool, or well bore perforator, releasably mounted thereon into the borehole. An extension member, which is also lowered through the drill pipe, is secured to the well-logging tool, or well bore perforator, and releases it from the drill pipe, whereupon the extension member and well-logging tool or well bore perforator are moved through the borehole. The apparatus includes a latching sub mounted to the end of the length of drill pipe, and a latching head releasably mounted within the latching sub for releasably holding a well-logging tool or well bore perforator within the latching sub.

45 Claims, 13 Drawing Figures

147
148
149
150
151
153'
155
143'
153
152'
152
157
143
144
141
140
156
154

147
148
149
150
151
153'
153
152'
152
143'
143
144
141
140
154

147
148
149
150
151
153
152
153'
143'
143
144
141
140

147
148
149
150
151
143'
143
156
144
140
141
145
154
157

METHOD AND APPARATUS FOR CONDUCTING LOGGING OR PERFORATING OPERATIONS IN A BOREHOLE

Matter enclosed in heavy brackets [ ] appears in the original patent but forms no part of this reissue specification; matter printed in italics indicates the additions made by reissue.

FIELD OF THE INVENTION

The invention relates to a method and apparatus for conducting logging or perforating operations in a borehole particularly in deviated boreholes.

DESCRIPTION OF THE PRIOR ART

Many wells being drilled today in the search for oil and gas have portions of the borehole deviating from the usual vertical orientation thereof. Conditions, such as: shallow depth gas production; restrictions imposed by governmental agencies on the number of production platforms in certain areas; and exploration of reservoirs under shipping fairways, have resulted in boreholes including an increasing number of long, high deviation ramps, generally above 70° angles of deviation and lengths up to 16,000 feet.

Conventional well-logging tools, used to determine various physical parameters of formations adjacent the borehole, and conventional well bore perforators, used to perforate cased boreholes, cannot rely upon gravitational forces to enable such well-logging tools and well bore perforators to traverse the borehole while suspended from a well-logging cable in a highly deviated borehole. Thus, it has previously been proposed to move conventional well-logging tolls through a borehole by use of an extension member affixed to the well-logging tool, whereby the well-logging tool can be pushed or pulled through the borehole via the rigid extension member.

One example of such a technique is disclosed in U.S. Pat. No. 4,064,939, issued to Marquis on Dec. 27, 1977. This patent discloses a method for logging earth formations surrounding a borehole including running a string of drill pipe into the borehole and then mounting a well-logging tool on a string of tubing. The tubing and well-logging tool are lowered through the drill pipe until the well-logging tool exits the lower end of the drill pipe into the borehole. The basic problem with such a method is the size constraints placed upon the well-logging tool that may be utilized with this method, since the size of the well-logging tool is limited to the inside diameter of the drill pipe. In some instances high strength joints may be utilized for the drill pipe and such high strength joints will not even permit well-logging tools having an outer diameter of 2⅞ inches to be passed through those joints. Since standard size well-logging tools have an outer diameter of approximately 3⅜ inches, such standard size well-logging tools cannot be lowered through a drill pipe, regardless of whether or not such drill pipe is disposed in a non-deviated or deviated borehole.

Accordingly, prior to the development of the present invention, there has been no method and apparatus for conducting logging or perforating operations in a borehole, particularly a deviated borehole, wherein a standard size well-logging tool or well bore perforator has been efficiently and economically utilized, and reliably transports the well-logging tool to its desired position in the borehole.

Therefore, the art has sought a method and apparatus for conducting logging or perforating operations in a borehole which permits the use of standard size well-logging tools or wellbore perforators in a deviated borehole which is efficient and economical to use, and reliably transports the well-logging tool or well bore perforator to its desired position in the borehole.

SUMMARY OF THE INVENTION

In accordance with the invention the foregoing has been achieved through the present invention method and apparatus for conducting logging or perforating operations in a borehole. The method of the present invention for logging earth formations surrounding a borehole, utilizing a well-logging tool or well bore perforator, releasably mounted to the end of a length of drill pipe includes: lowering the length of drill pipe, having the well-logging tool or well bore perforator, releasably mounted thereon, into the borehole; lowering an extension member through the drill pipe into engagement with the well-logging tool or well bore perforator; securing the extension member to the well-logging tool or well bore perforator; releasing the well-logging tool, or well bore perforator, with the extension member secured thereto, from the drill pipe; and moving the well-logging tool or well bore perforator, with the extension member secured thereto, through the borehole and beyond the drill pipe to log at least a portion of the earth formation surrounding the borehole or to perforate at least a portion of the casing in the borehole.

A feature of the method of the present invention resides in the fact that the well-logging tool or well bore perforator may be releasably mounted within a latching sub and the latching sub may be secured to the end of the drill pipe. Fluid may be pumped down the drill pipe to lower the extension member.

Another feature of the method of the present invention includes the step of attaching a locomotive to the extension member and pumping fluid into the drill pipe into contact with the locomotive to cause the extension member to be lowered through the drill pipe and out of the drill pipe into the borehole. Alternatively, the extension member may be lowered through the drill pipe by the force of gravity. The method of the present invention further includes the step of utilizing a standard size well-logging tool or well bore perforator.

A further feature of the method of the present invention includes the steps of: raising the well-logging tool, or well bore perforator, with the extension member secured thereto, into the drill pipe; releasably mounting the well-logging tool, or well bore perforator, to the drill pipe; releasing the extension member from the well-logging tool, or well bore perforator; raising the extension member through the drill pipe; and moving the drill pipe, with the well-logging tool, or well bore perforator, secured thereto, through the borehole, whereby additional logging operations or perforating operations, can be conducted in another part of the borehole or the well-logging tool, or well bore perforator, may be removed from the borehole. A further, additional feature of the method of the present invention is the step of releasably mounting the well-logging tool, or well bore perforator, within a latching sub and securing the latching sub to the end of the drill pipe.

The apparatus of the present invention, for use in logging earth formations surrounding a borehole or in perforating a cased borehole includes: a latching sub having upper and lower ends and a central bore, including means for mounting the latching sub to the end of a length of drill pipe, the means for mounting being disposed at the upper end of the latching sub; and a latching head, having upper and lower ends, releasably mounted within the bore of the latching sub, said latching head having means for attaching a well-logging tool, or well bore perforator, to the lower end of the latching head; a first electrical connection means disposed at the upper end of the latching head; and releasable latching means for engagement with the latching sub to releasably secure the latching head to the latching sub, whereby the well-logging tool or well bore perforator, may be selectively released from the latching sub to enter the borehole.

A feature of the apparatus of the present invention is that the latching sub includes means for protecting the well-logging tool, or well bore perforator, disposed at the lower end of the latching sub. The means for protecting may be a length of pipe adapted to receive the well-logging tool, or well bore perforator.

A further feature of the apparatus of the present invention is a means for restraining the latching head from passing upwardly through the latching sub, which restraining means is disposed at the upper end of the latching sub. The restraining means may comprise a reduced diameter bore portion in the upper end of the latching sub.

An additional feature of the apparatus of the present invention is a means for selectively actuating the releasable latching means, which actuating means includes a second electrical connection means. The actuating means may comprise a cylindrical actuating sub adapted to pass through the drill pipe and engage the latching head within the latching sub. The actuating sub may have a diameter equal to, or less than, the reduced diameter bore portion in the upper end of the latching sub, whereby the actuating sub can pass through the drill pipe and into the latching sub to engage the latching head.

The method and apparatus for conducting logging or perforating operations in a borehole of the present invention, when compared with previously proposed prior art methods and apparatus, has the advantages of: efficiency, ease of use; reliability in accurately transporting the well-logging tool or well bore perforator to the desired position in the borehole; and allowing the use of standard size well-logging tools, or well bore perforators, in deviated boreholes.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 2:
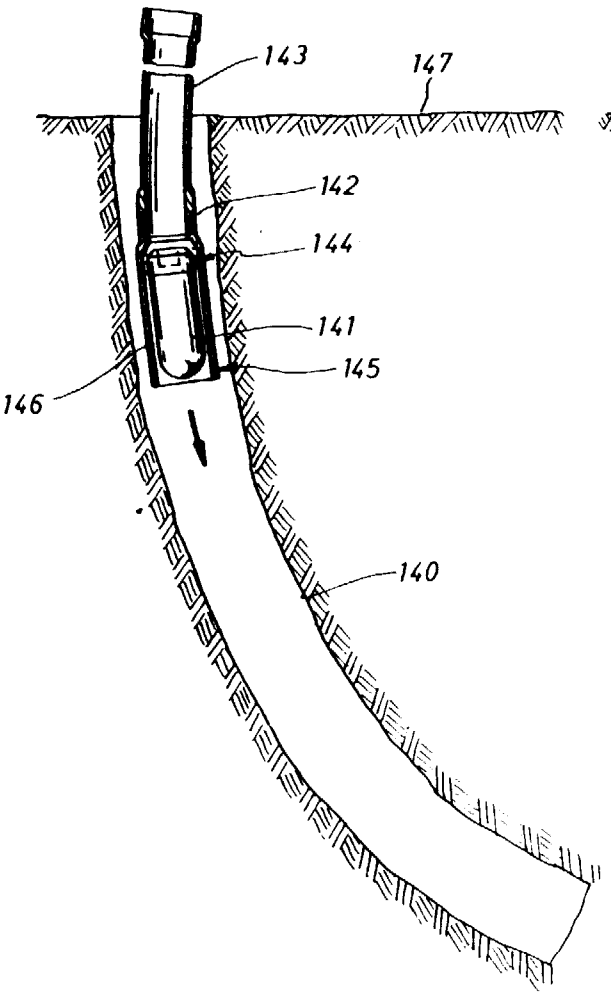
Figure 1:
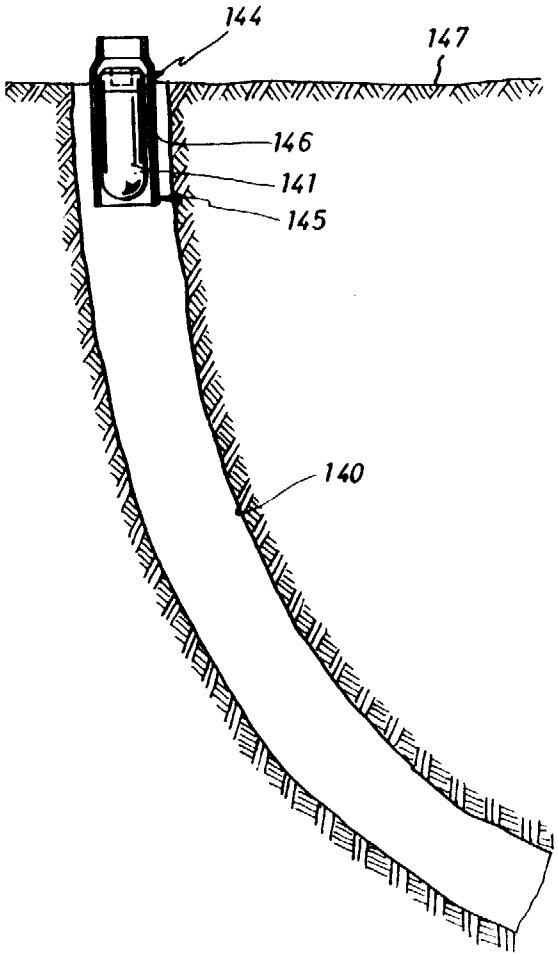

With reference to FIGS. 1-12, the method of logging earth formations surrounding a borehole, or perforating a cased borehole, in accordance with the present invention, will be described. In FIGS. 1-12, an open deviated borehole 140 is shown. With reference to FIGS. 1 and 2, a conventional well-logging instrument 141 is shown releasably mounted to the end 142 of a length of drill pipe 143. Well-logging instrument 141 may be either a conventional well-logging tool for logging earth formations surrounding borehole 140, or could be a conventional well bore perforator, used to perforate a cased borehole, such as borehole 140 when it has a cement casing therein. Hereinafter, the notation "well-logging instrument" denotes both a well-logging tool for logging earth formations surrounding a borehole and a well bore perforator for perforating a cased borehole.

Well-logging instrument 141 may be of any desired size; however, well-logging instrument 141 is preferably a standard size well-logging instrument, such that its outer diameter is approximately 3⅝ inches which is greater than the inner diameter of drill pipe 143.

Figure 12:
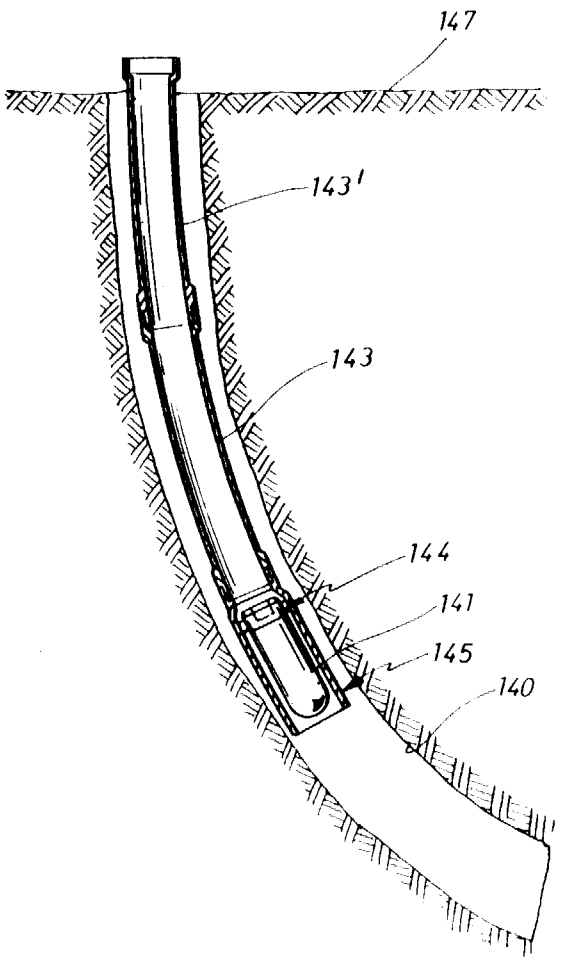
Figure 13:
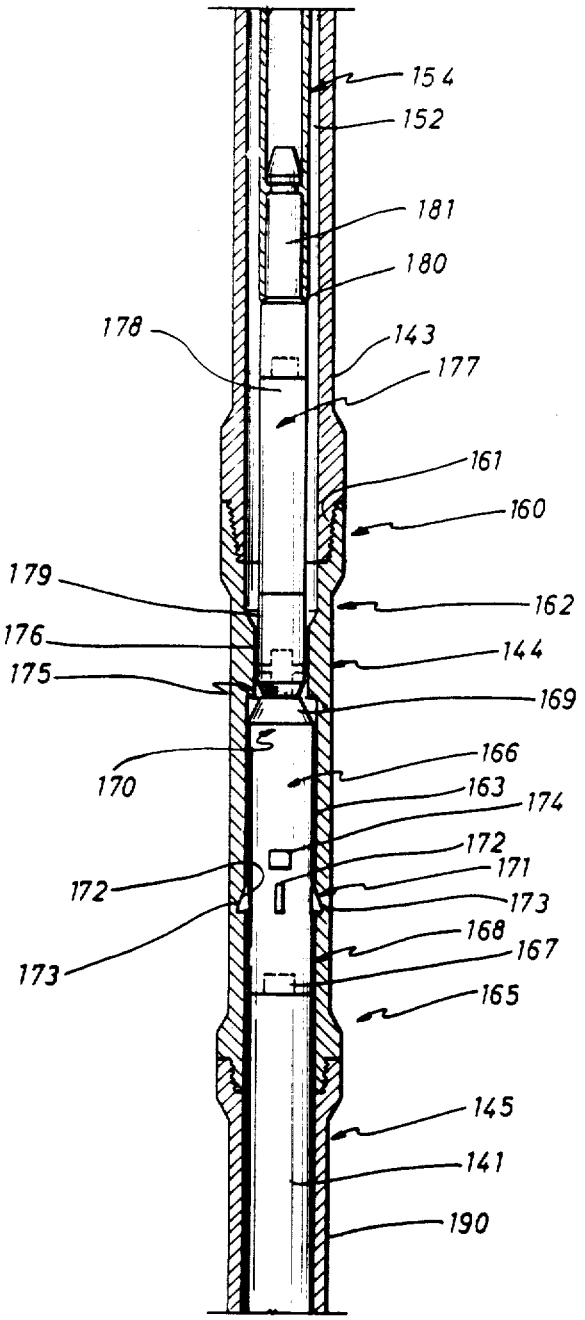
FIG. 13 is a partial cross-sectional view of an apparatus for conducting logging or perforating operations in a borehole in accordance with the present invention.

As will hereainfter be described with reference to FIG. 13, well-logging tool 141 may be releasably mounted within a latching sub which is secured to the end of drill pipe 143, and a latching sub is schematically shown at 144 in FIGS. 1-12. As will also be hereinafter described with respect to FIG. 13, the latching sub may include a means for protecting 145 the well-logging instrument 141, which protection means 145 is disposed at the lower end of the latching sub 144. Preferably, as shown in FIGS. 1-12, and as will also be hereinafter described with respect to FIG. 13, the protection means 145 is a length of pipe 146 adapted to receive the well-logging instrument 141.

Figure 3:
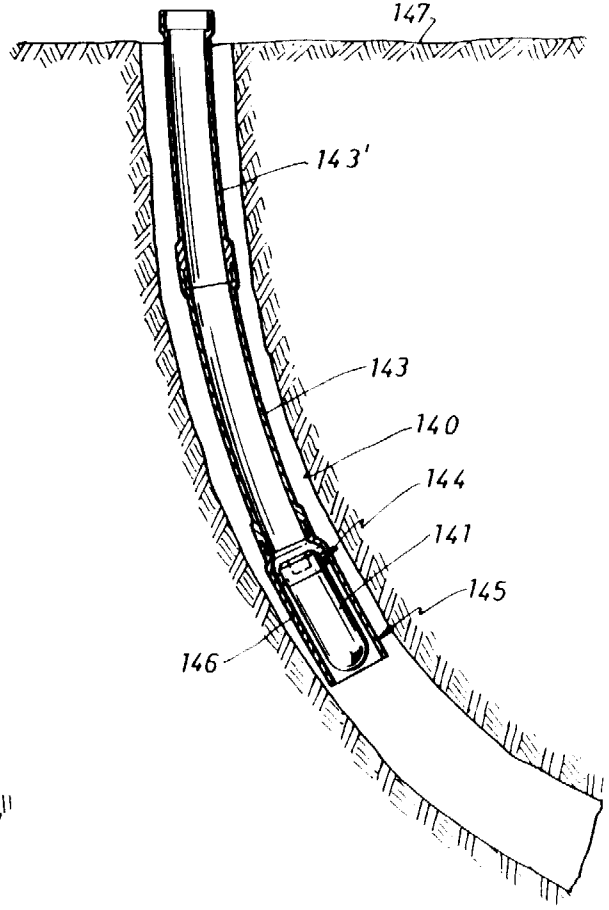
FIGS. 1-12 are schematic cross-sectional views of a deviated borehole illustrating the method of conducting logging or perforating operations in a borehole in accordance with the present invention.

Turning now to FIG. 3, it is seen that an additional section of drill pipe 143' has been added to the first section of drill pipe 143. The length of drill pipe 143, 143', . . . , having the well-logging instrument 141 releasably mounted thereon via the latching sub at 144, is thus lowered into borehole 140. The depth at which logging or well perforating operations are to be conducted within borehole 140 determines how many sections of drill pipe 143, 143', 133" . . . , are lowered within borehole 140. Any suitable equipment (not shown) may be disposed at the earth's surface 147 to accomplish the lowering of the length of drill pipe 143, 143', . . . . As the length of drill pipe 143, 143', . . . , is lowered into borehole 140, protection means 145, or the length of pipe 146, protects well-logging instrument 141 from contacting the interior of borehole 140, and from otherwise being damaged while well-logging instrument 141 is releasably mounted on drill pipe 143 as it is being lowered into borehole 140 to its desired location.

Figure 4:
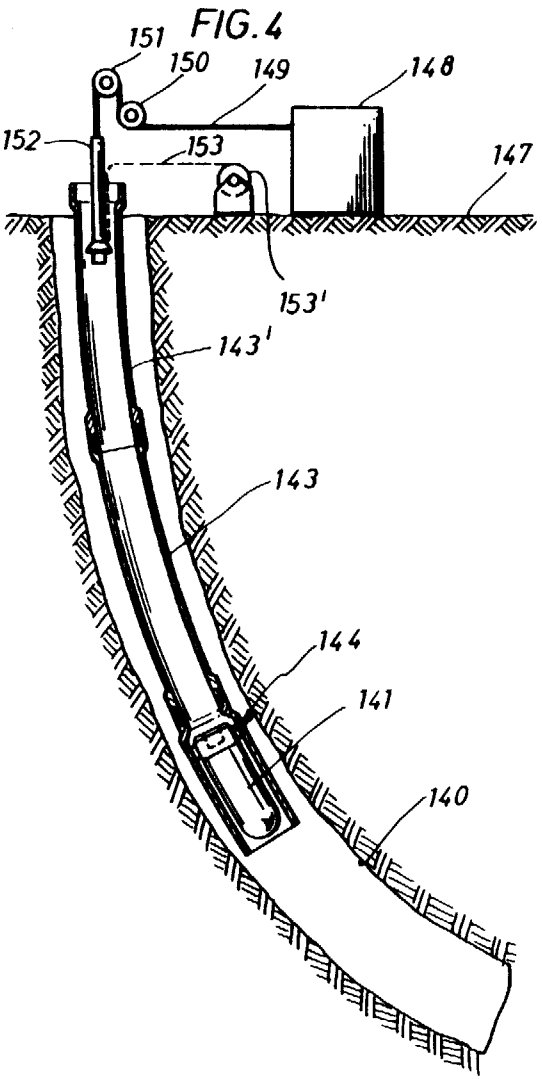

Turning now to FIG. 4, it is seen that at the earth's surface 147 is disposed conventional surface equipment 148 which receives measurement signals detected by means of sensors in the well-logging instrument 141 when well-logging instrument 141 is a well-logging tool, as is well known in the art. Alternatively, when well-logging instrument 141 is well bore perforator, conventional surface equipment 108 would transmit signals to the well bore perforator to initiate the operation of the well bore perforator as is also well known in the art. A single or multi-conductor conventional well-logging cable 149 is associated with surface equipment 148 and cable 149 passes over pulleys 150 and 151. Cable 149 can be extended or retracted by a conventional surface winch (not shown) so as to allow the equipment to be hereinafter described to be suspended from cable 149 and raised or lowered within borehole 140.

Still with reference to FIG. 4, it is seen that a rigid extension member 152 is secured to the end of cable 149. Extension member 142 may be any conventional rigid extension member; however, extension member 152 is shown as that being described in U.S. patent application Ser. No. 194,010, filed concurrently herewith and assigned to the same assignee as this application, the details of which form no part of the present invention. Extension member 152 allows another well-logging cable 153 to be mounted to the exterior of extension member 152. Well-logging cable 153 is wound upon a reel 153' also disposed at the earth's surface 147.

Figure 6:
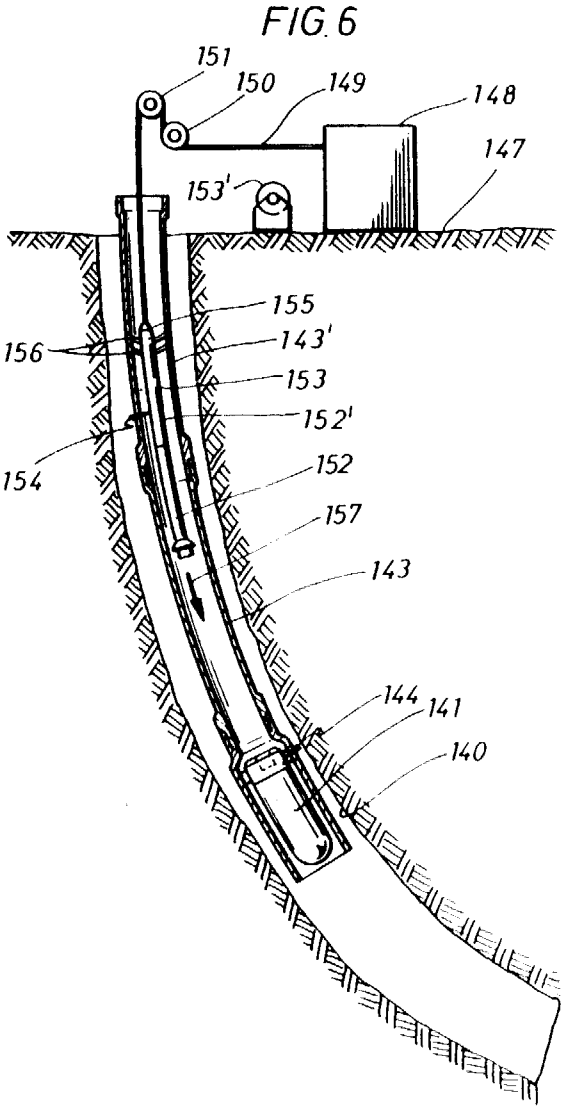
Figure 5:
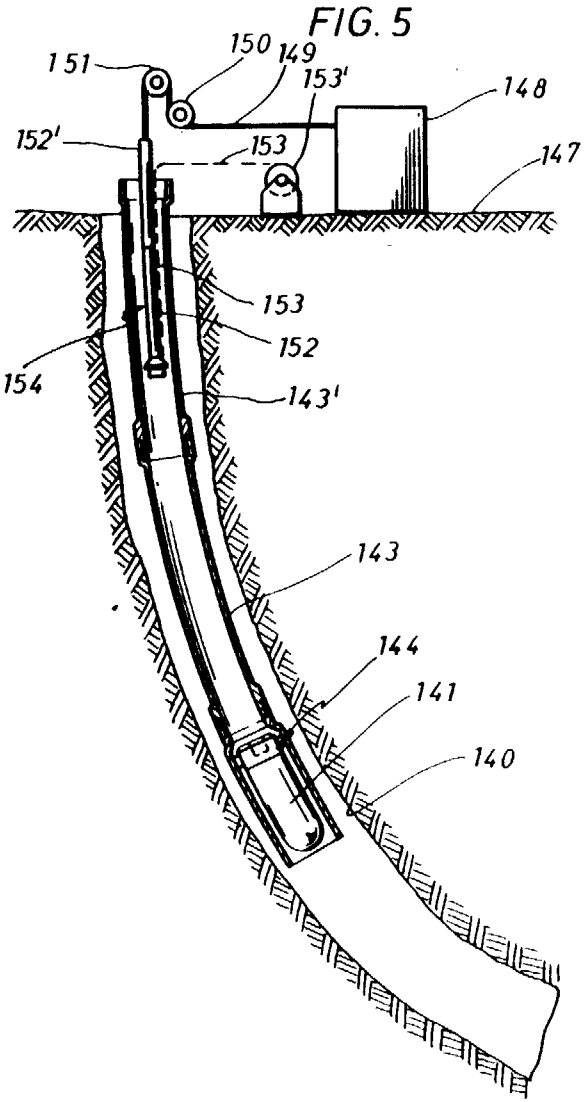

With reference now to FIGS. 5 and 6, an additional rigid extension member 152' has been connected to rigid extension 152. The number of sections of rigid extension member 152, 152', 152'', . . . , which are connected to form one integral rigid extension member 154 is dependent upon the distance which well-logging instrument 141 is intended to move within borehole 140, as will be hereinafter described in connection with FIG. 9. As the additional extension member sections 152, 152', 152'', . . . , are connected, the preceding extension member sections are lowered through drill pipe 143' and well-logging cable 153 is unwound from reel 153' and secured to the exterior of the extension members 152, 152'', . . . . As shown in FIG. 6, when the desired length of rigid extension member 154 is achieved, well-logging cable 153 is connected to well-logging cable 149 via a conventional torpedo sub 155. Thus, rigid extension member 154 may be lowered into drill pipe 143, 143', . . . , while extension member 154 is suspended from well-logging cable 149 and torpedo sub 155.

As further shown in FIG. 6, a rubber cup locomotive 156 may be attached to the upper end of extension member 154. Upon pumping a drilling fluid, such as drilling mud (not shown) into drill pipe 143', the pressure exerted by the drilling mud upon rubber cup locomotive 156 forces the extension member 154 downwardly through drill pipe 143 in the direction shown by arrow 157. Alternatively, extension member 154 could be lowered through drill pipe 143 by the force of gravity.

Figures 7, 8, 9:
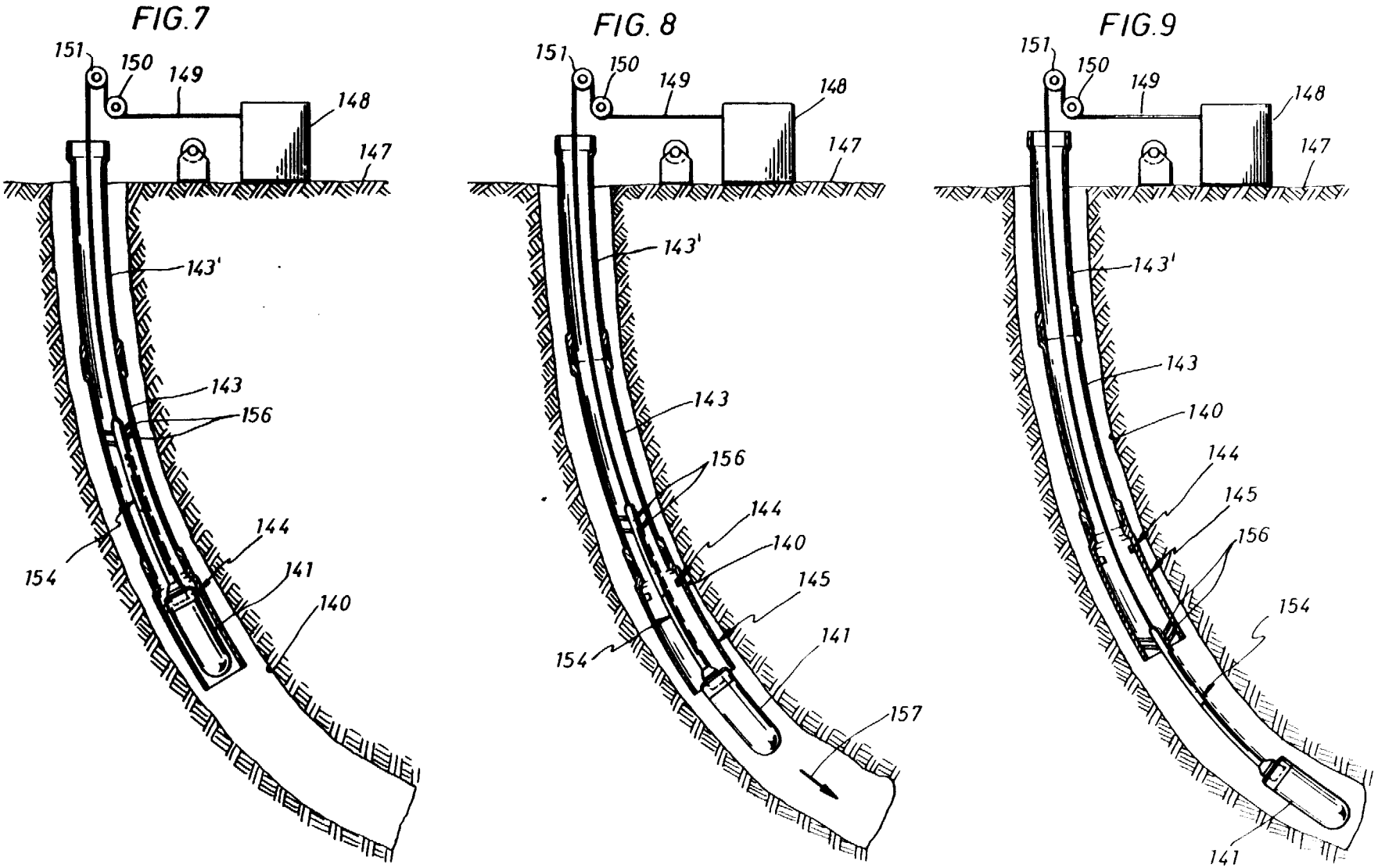

Turning now to FIG. 7, extension member 154 has been lowered through drill pipe 143, 143' into engagement with well-logging instrument 141, whereupon extension member 154 is secured to the well-logging instrument 141. After extension member 154 is secured to well-logging instrument 141, well-logging instrument 141 is released from drill pipe 143. Thus, latching sub 144 is actuated to release, or unlatch, well-logging instrument 141 from drill pipe 143.

With reference to FIGS. 8 and 9, upon further pumping of drilling mud (not shown) against rubber cup locomotive 156, well-logging apparatus 141 is moved outwardly from protection means 145, or pipe 144, downwardly into borehole 140 in the direction shown by arrow 157. Alternatively, extension member 154 with well-logging instrument 141 secured thereto, can be lowered into borehole 140 by the force of gravity. As shown in FIG. 9, well-logging instrument 141, with extension member 154 secured thereto, is then moved through the borehole 140 and beyond drill pipe 143 to allow well-logging instrument 141 to operate in the desired portion of borehole 140. The distance over which well-logging instrument 141 can move in borehole 140 is determined by the length of extension member 154, since rubber cup locomotive 156 is prevented from exiting drill pipe 143 or protection means 145 by any conventional means (not shown) such as a go-no go nipple. When well-logging instrument 141 is a well-logging tool, well-logging instrument 141 would log at least a portion of the earth formations surrounding borehole 140 as extension member 154 and well-logging instrument 141 are moved through borehole 140. When well-logging instrument 141 is a well bore perforator well-logging instrument 141 is moved through borehole 140 and beyond drill pipe 143 to the location within borehole 140 whereat it is desired to perforate at least a portion of the cased borehole.

Figure 11:
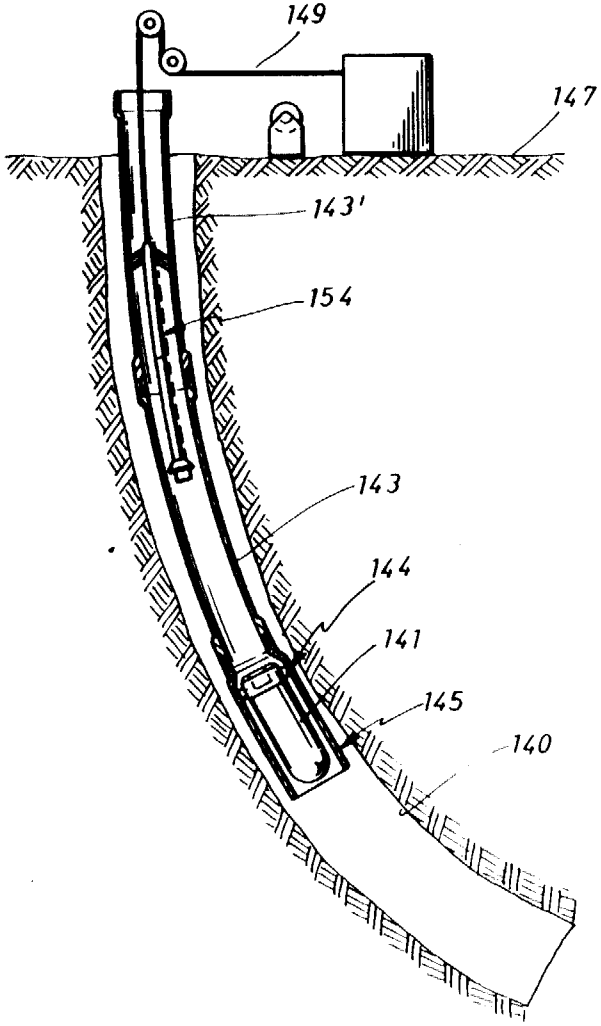
Figure 10:
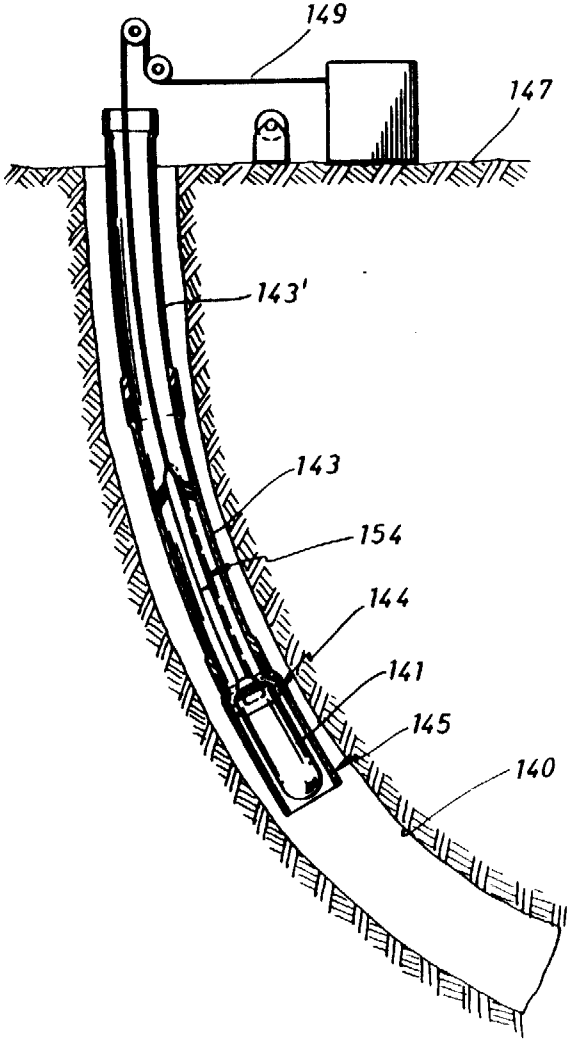

Upon completion of the desired well-logging or perforating operation, well-logging instrument 141 and extension member 154 secured thereto would be raised via well-logging cable 149 back into drill pipe 143 as shown in FIG. 10. Well-logging instrument 141 would then be releasably remounted to drill pipe 143, as by activating latching sub 144, which is secured to the end of drill pipe 143, thus releasably mounting well-logging instrument 141 to drill pipe 143. Extension member 154 is then released from its engagement with well-logging instrument 141, and extension member 154 is then raised through drill pipe 143, 143' as shown in FIG. 11. After extension member 154 has been raised to the earth's surface 147 through drill pipe 143, 143', . . . , the extension member sections 152, 152', . . . are disconnected, whereby extension member 154 can be removed from drill pipe 143', as shown in FIG. 12. If further well-logging operations or well bore perforating operations are desired in the same borehole 140, drill pipe 143, 143', . . . , can be moved upwardly or downwardly within borehole 140, by adding or removing sections of drill pipe 143, 143', . . . , to a position within borehole 140 adjacent the point where additional well-logging operations or well bore perforating operations are desired. Alternatively, drill pipe 143, 143', with well-logging instrument 141 secured thereto, can be moved 67 a well-logging instrument 141 to the lower end 168 of latching head 166. Attachment means 167 may be any conventional connection device as are known in the art.

Latching head 166 has a first electrical connection means 169 disposed at the upper end 170 of latching head 166. First electrical connection means 169 is a wet connector and allows electrical signals to be transmitted, from it to conventional circuitry in latching head 166, so as to activate well-logging instrument 141. Latching head 166 also includes releasable latching means 171 for engagement with latching sub 144 to releasably secure latching head 166 to latching sub 144. Releasable latching means 171 may comprise a plurality of pivoted latching wedges 172 which cooperate with a plurality of mating recesses 173 formed in the interior bore surface 163 of latching sub 144. Latching wedges 172 may be spring biased, whereby upon the upward movement of latching head 166 into bore 163 of latching sub 144, such wedges are inwardly compressed until latching wedges 172 pivot outwardly into engagement with recesses 173 of latching sub 144. Latching head 166 also includes any suitable mechanism (not shown) for applying a force to selectively retract latching wedges 172, when it is desired to selectively release, or unlatch, latching head 166 from latching sub 144. Such powered unlatching means 174, shown schematically in FIG. 13, may be either electrically or hydraulically operated, and is adapted to be controlled by any suitable signal transmitted to it via first electrical connection means 169 in a conventional manner, whereupon latching wedges 172 pivot inwardly and out of engagement with recesses 173.

Latching sub 144 may also include a means for protecting 145 the well-logging instrument 141, which protection means 145 is disposed at the lower end 165 of latching sub 144. Preferably, protection means 145 comprises a length of pipe 190 adapted to receive the well-logging instrument 141 therein. Of course, pipe 190 may have any internal diameter as will enable well-logging instrument 141 to pass therethrough, and the interior diameter of bore 163 of latching sub 144 preferably has the same internal diameter. It should be understood that although latching sub 144 and protection means 145 are shown in FIG. 13 to have substantially the same outer and inner diameters as those of drill pipe 143, the outer and inner diameters of latching sub 144 and protection means 145 could be larger than those of drill pipe 143, whereby a larger diameter latching head 166 and well-logging instrument 141 could be utilized.

Toward the upper end 162 of latching sub 144 is disposed a means for restraining 175 latching head 166 from passing upwardly through latching sub 144. Restraining means 175 may comprise a reduced diameter bore portion 176 disposed toward the upper end 162 of latching sub 144. A means for selectively actuating 177 the releasable latching means 171 of latching head 166 is provided. Selective actuation means 177 may comprise a generally cylindrical actuating sub 178 adapted to pass through drill pipe 143 and engage latching head 166 while it is disposed within latching sub 144. Selective actuation means 177 includes a second electrical connection means 179 disposed at the lower end of actuating sub 178. Second electrical connection means 179 is a wet connector adapted to mate and engage with first electrical connection means 169 of latching head 166 to physically secure together actuating sub 178 and latching head 166. Via a suitable signal transmitted from actuating sub 178 via electrical connectors 179 and 169, powered unlatching mechanism 174 may be activated to retract releasable latching means 171, as will be hereinafter described. Actuating sub 178 may include at its upper end a cable head 180 which is adapted to secure actuating sub 178 to the lower extension member section 152 of extension member 154. Thus, actuating sub 178 can be moved through drill pipe 143 via movement of extension member 154. Actuating sub 178 may also include a fishing bell 181 to allow actuating sub 178 to be engaged by a fishing tool (not shown) and removed from drill pipe 143, should actuating sub 178 somehow be disconnected from extension member 154. As is shown in FIG. 13, actuating sub 178 has a diameter equal to, or less than, the reduced diameter bore portion 176 in the upper end 162 of latching sub 144, whereby actuating sub 178 can pass through drill pipe 143 and into the latching sub 144 to engage latching head 166.

In operation, drill pipe 143, having well-logging instrument 141 releasably mounted thereon via latching head 166 releasably secured within latching sub 144, is lowered into the borehole. After drill pipe 143 and latching sub 144, with latching head 166 and well-logging instrument 141 disposed therein, are lowered to the desired location within the borehole; actuating sub 178, secured to extension member 154, is then lowered through drill pipe 143 until actuating sub 178 engages and is secured to latching head 166. Extension member 154 is thus operatively associated with well-logging instrument 141 via actuating sub 178 and latching head 166, including the electrical and physical connection made between first electrical connection means 169 of latching head 166 and second electrical connection means 179 of actuating sub 178. A signal is then transmitted from actuating sub 178 to powered unlatching means 174, whereby latching wedges 172 are retracted, thus releasing latching head 166, with well-logging instrument 141 secured thereto, from latching sub 144. Extension member 154, actuating sub 178, latching head 166, and well-logging instrument 141 are then lowered and may be moved into the borehole and beyond the drill pipe 143, including protection means 145, so that well-logging operations or well bore perforating operations may be conducted in the borehole.

Upon raising extension member 154 back into drill pipe 143, latching wedges 172 would engage recesses 173, thus releasably securing well-logging instrument 141 within latching sub 144. Reduced bore portion 176 of latching sub 144 precludes any extra upward movement of latching head 166 after latching wedges 172 outwardly engage recesses 173. Actuating sub 178 may then be released from latching head 166 and moved upwardly through drill pipe 143 and out of the borehole.

It is to be understood that the invention is not limited to the exact details of construction, operation, exact materials or embodiment shown and described, as obvious modifications and equivalents will be apparent to one skilled in the art. Accordingly, the invention is therefore to be limited only by the scope of the appended claims.

We claim:

1. A method for logging earth formations surrounding a borehole, utilizing a well-logging tool releasably mounted to the end of a length of drill pipe, comprising:
   - lowering the length of drill pipe, having the well-logging tool releasably mounted thereon, into the borehole;
   - lowering an extension member through said drill pipe into engagement with said well-logging tool;
   - securing said extension member to said well-logging tool;
   - releasing said well-logging tool, with said extension member secured thereto, from said drill pipe; and
   - moving said well-logging tool, with said extension member secured thereto, through the borehole and beyond the drill pipe to log at least a portion of the earth formations surrounding said borehole.

2. The method of claim 1, including the steps of releasably mounting said well-logging tool within a latching sub and securing said latching sub to the end of the drill pipe.

3. The method of claim 1, including the step of pumping fluid down the drill pipe to lower said extension member.

4. The method of claim 3, further including the step of attaching a locomotive to said extension member and pumping the fluid into said drill pipe into contact with said locomotive to cause said extension member to be lowered through said drill pipe and out of the drill pipe into said borehole.

5. The method of claim 1, wherein said extension member is lowered through said drill pipe by the force of gravity.

6. The method of claim 1, including the step of utilizing at least a standard size well-logging tool.

7. The method of claim 1, further including the steps of:

raising the well-logging tool, with said extension member secured thereto, into the drill pipe;

releasably mounting the well-logging tool to the drill pipe;

releasing the extension member from the well-logging tool;

raising the extension member through said drill pipe; and moving the drill pipe, with said well-logging tool secured thereto, through the borehole, whereby additional logging operations can be conducted in another part of the borehole or to remove the well-logging tool from the borehole.

8. The method of claim 7, including the steps of releasably mounting said well-logging tool within a latching sub and securing said latching sub to the end of the drill pipe.

9. A method for perforating a cased borehole, utilizing a well bore perforator releasably mounted to the end of a length of drill pipe, comprising:

lowering the length of drill pipe, having the well bore perforator releasably mounted thereon, into the borehole;

lowering an extension member through said drill pipe into engagement with said well bore perforator;

securing said extension member to said well bore perforator;

releasing said well bore perforator, with said extension member secured thereto, from said drill pipe; and moving said well bore perforator, with said extension member secured thereto, through the borehole and beyond the drill pipe to perforate at least a portion of the cased borehole.

10. The method of claim 9, including the steps of releasably mounting said well bore perforator within a latching sub and securing said latching sub to the end of the drill pipe.

11. The method of claim 9, including the step of pumping fluid down the drill pipe to lower said extension member.

12. The method of claim 11, further including the step of attaching a locomotive to said extension member and pumping the fluid into said drill pipe into contact with said locomotive to cause said extension member to be lowered through said drill pipe and out of the drill pipe into said borehole.

13. The method of claim 9, wherein said extension member is lowered through said drill pipe by the force of gravity.

14. The method of claim 9, including the step of utilizing at least a standard size well bore perforator.

15. The method of claim 9, further including the steps of:

raising the well bore perforator, with said extension member secured thereto, into the drill pipe;

releasably mounting the well bore perforator to the drill pipe;

releasing the extension member from the well bore perforator;

raising the extension member through said drill pipe; and moving the drill pipe, with said well bore perforator secured thereto through the borehole, whereby additional perforating operations can be conducted in another part of the borehole or to remove the well bore perforator from the borehole.

16. The method of claim 15, including the steps of releasably mounting said well bore perforator within a latching sub and securing said latching sub to the end of the drill pipe.

17. Apparatus for use in logging earth formations surrounding a borehole, comprising:

a latching sub having upper and lower ends and a central bore, including means for mounting said latching sub to the end of a length of drill pipe, said means for mounting disposed at the upper end of said latching sub; and a latching head, having upper and lower ends, releasably mounted within the bore of said latching sub, said latching head having;

means for attaching a well-logging tool to the lower end of said latching head;

a first electrical connection means disposed at the upper end of said latching head;

releasable latching means for engagement with said latching sub to releasably secure said latching head to said latching sub; and means for selectively actuating said releasable latching means, said actuating means including a second electrical connection means, whereby the well-logging tool may be selectively released from the latching sub to enter the borehole.

18. The apparatus of claim 17, wherein the latching sub includes means for protecting the well-logging tool, which means are disposed at the lower end of said latching sub.

19. The apparatus of claim 18, wherein the means for protecting is a length of pipe adapted to receive the well-logging tool.

20. The apparatus of claim 17, including means for restraining the latching head from passing upwardly through the latching sub, said restraining means being disposed at the upper end of said latching sub.

21. The apparatus of claim 20, wherein said restraining means comprises a reduced diameter bore portion in the upper end of said latching sub.

22. The apparatus of claim 21, further including means for selectively actuating said releasable latching means, said actuating means including a second electrical connection means.

23. The apparatus of claim 22, wherein said actuating means comprises a cylindrical actuating sub adapted to pass through the drill pipe and engage the latching head mounted within said latching sub.

24. The apparatus of claim 23, wherein said actuating sub has a diameter equal to, or less than, the reduced diameter bore portion in the upper end of said latching sub, whereby said actuating sub can pass through said drill pipe and into the latching sub to engage said latching head.

25. The apparatus of claim 17, wherein said actuating means comprises a cylindrical actuating sub adapted to pass through the drill pipe and engage the latching head mounted within said latching sub.

26. Apparatus for use in perforating a cased borehole, comprising:

a latching sub having upper and lower ends and a central bore, including means for mounting said latching sub to the end of a length of drill pipe, said means for mounting disposed at the upper end of said latching sub; and a latching head, having upper and lower ends, releasably mounted within the bore of said latching sub, said latching head having:

means for attaching a well bore perforator to the lower end of said latching head;

a first electrical connection means disposed at the upper end of said latching head;

releasable latching means for engagement with said latching sub to releasably secure said latching head to said latching sub; and means for selectively actuating said releasable latching means, said actuating means including a second electrical connection means, whereby the well-logging tool may be selectively released from the latching sub to enter the borehole.

27. The apparatus of claim 26, wherein the latching sub includes means for protecting the well bore perforator, which means is disposed at the lower end of said latching sub.

28. The apparatus of claim 27, wherein the means for protecting is a length of pipe adapted to receive the well bore perforator.

29. The apparatus of claim 26, including means for restraining the latching head from passing upwardly through the latching sub, said restraining means being disposed at the upper end of said latching sub.

30. The apparatus of claim 29, wherein said restraining means comprises a reduced-diameter bore portion in the upper end of said latching sub.

31. The apparatus of claim 30, further including means for selectively actuating said releasable latching means, said actuating means including a second electrical connection means.

32. The apparatus of claim 31, wherein said actuating means comprises a cylindrical actuating sub adapted to pass through the drill pipe and engage the latching head mounted within said latching sub.

33. The apparatus of claim 32, wherein said actuating sub has a diameter equal to, or less than, the reduced diameter bore portion in the upper end of said latching sub, whereby said actuating sub can pass through said drill pipe and into the latching sub to engage said latching head.

34. The apparatus of claim 26, wherein said actuating means comprises a cylindrical actuating sub adapted to pass through the drill pipe and engage the latching head within said latching sub.

*35. A method for logging earth formations surrounding a borehole by means of a well-logging tool, comprising:*

*providing a drill pipe with a tubular protection means at the end thereof, in such manner that the protection means forms an extension to said drill pipe,*

*attaching the well-logging tool to the end of the drill pipe so that said tool is positioned within said protection means,*

*lowering the protection means with the tool carried therein into the borehole, and*

*moving the tool through the borehole to log at least a portion of the formations surrounding the borehole.*

*36. A method for logging earth formations surrounding a borehole by means of a well-logging tool, comprising:*

*providing a drill pipe with a tubular protection means at the end thereof, in such manner that the protection means forms an extension to said drill pipe,*

*releasably attaching the well-logging tool within said protection means,*

*lowering the protection means with the tool carried therein into the borehole, releasing the tool from the protection means and displacing the tool beyond the protection means prior to the following step,*

*moving the tool through the borehole to log at least a portion of the formations surrounding the borehole.*

*37. The method of claim 36, wherein the tool is displaced by applying a force to an extension member disposed within the drill pipe and secured to the tool.*

*38. The method of claim 37, wherein the force is applied to the extension member by pumping fluid down the drill pipe.*

*39. The method of claim 37, comprising the step of connecting a well-logging cable to the tool after the tool has been lowered into the borehole within the protection means.*

*40. The method of claim 39, wherein the step of moving the tool, together with the extension member, is carried out by pulling on the cable until the tool engages the protection means.*

*41. The method of claim 36, wherein the protection means has an inner diameter larger than the inner diameter of the drill pipe.*

*42. An apparatus for logging with a logging tool earth formations surrounding a borehole into which a drill pipe is insertable, comprising:*

*a tubular protection means for protecting the tool adapted to have the tool mounted therein,*

*means for coupling said protection means to the end of the drill pipe in a configuration in which said protection means forms an extension to the drill pipe,*

*means for mounting the tool within the protection means, and*

*means for moving the tool through the borehole.*

*43. The apparatus of claim 42, wherein the tool is releasably mounted within said protection means, and further comprising means for displacing the tool beyond the protection means into the borehole.*

*44. The apparatus of claim 43, wherein said displacing means comprises an extension member disposed within the drill pipe and secured to the tool, and means for applying a force to the extension member.*

*45. An apparatus for logging earth formations surrounding a borehole, comprising:*

*a drill pipe* a tubular protection means coupled to the end of the drill pipe for releasably mounting therein, a well-*logging tool, said protection means forming an extension to said drill pipe, and having an inner diameter larger than that of the drill pipe, means for displacing the tool beyond the protection means into the borehole, and*

*means for moving the tool through the borehole.*

* * * * *